April 27, 1926.

C. A. ZAROBSKY 1,582,862

DUST CAP MEANS

Filed June 29, 1925

Charles A. Zarobsky
Inventor
by Smith *Freeman*
Attorneys

Patented Apr. 27, 1926.

1,582,862

UNITED STATES PATENT OFFICE.

CHARLES A. ZAROBSKY, OF CLEVELAND, OHIO, ASSIGNOR TO THE SIMPLEX CAP COMPANY, OF CLEVELAND, OHIO, A CORPORATION OF OHIO.

DUST-CAP MEANS.

Application filed June 29, 1925. Serial No. 40,162.

*To all whom it may concern:*

Be it known that I, CHARLES A. ZAROBSKY, a citizen of the United States of America, and a resident of Cleveland, in the county of Cuyahoga and State of Ohio, have invented certain new and useful Improvements in Dust-Cap Means, of which the following is a full, clear, and exact description.

My invention concerns itself particularly with dust cap means for covering the valve tube of an automobile casing inner tube and the principal object of my invention is to provide new and improved means of this type. In the drawings accompanying this specification and forming a part thereof I have shown, for purposes of illustration, one form which my invention may assume. In these drawings:

Figure 4 shows the parts in assembled relation, while

Figure 1:
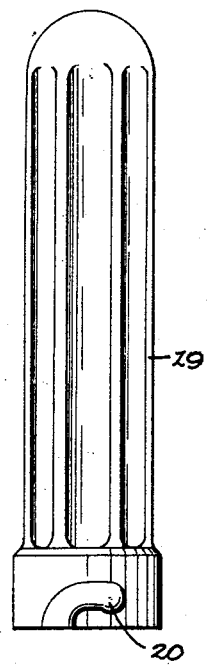
Figure 1 shows the cap portion of this embodiment of my invention.
Figure 2:
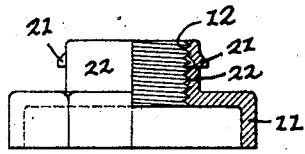
Figure 2 shows the locking portion of this embodiment of my invention.
Figure 3:
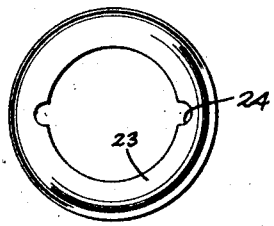
Figure 3 shows the resilient disc portion of this embodiment of my invention.
Figure 4:
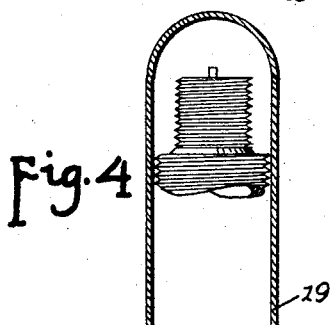
Figure 5:
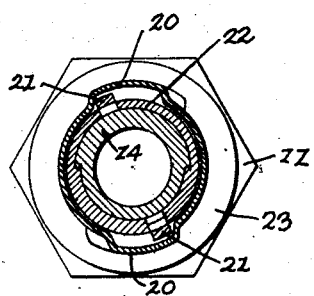
Figure 5 is a section on the line 5—5 of Figure 4.

The embodiment of my invention herein shown comprises a locking nut 11 screw threaded at 12 to engage the exterior screw threading 13 of the automobile casing inner tube valve tube 14 and lock this tube in operative position extending through the aperture 15 in the rim 16 with the washer 17 firmly clamped between the rim 16 and the depending lip 18 of the nut 11, and a dust cap 19 formed to surround the portion of the valve tube 14 projecting beyond the nut 11 and provided with two bayonet slots 20 adapted to cooperate with lugs 21 protruding from the tubular portion 22 of the nut 11 to form a bayonet joint between the dust cap 19 and the locking nut 11. This embodiment of my invention also comprises an annular resilient disc 23 formed to encircle the tubular portion 22 of the nut 11, provided with recesses 24 to permit assembly of the disc 23 over the projections 21 of the nut 11, engaging the dust cap 19 over an annular surface adjacent the exterior of the tubular portion 22 of the nut 11, concaved to engage the nut 11 only over an annular surface adjacent the periphery of the disc 23, and formed and proportioned to be sprung from normal position when the dust cap 19 is assembled on the nut 11 to thus, by its resiliency, hold the parts firmly and fixedly assembled secure against vibratory disengagement yet at all times easily intentionally disengaged.

It will be obvious to those skilled in the art that the embodiment of my invention herein shown and described provides dust cap means superior to anything heretofore known both in the facility of assembly and disassembly and the security against accidental disassembly, and that this embodiment of my invention incorporates advantages other than those specifically pointed out herein. It will also be obvious to those skilled in the art that some or all of the essential features of my invention may be used otherwise than as herein shown and with advantages other than those specifically pointed out herein or present in the embodiment of my invention shown herein, all without departing from the spirit of my invention. It will therefore be understood that this disclosure is illustrative only and that my invention is not limited thereto.

I claim:

1. In combination, a first member provided with a shoulder forming the projecting portion of said member of reduced cross-section, a second member formed to surround the projecting portion of said first member, a resilient disc interposed between said shoulder and the adjacent end of said second member, and bayonet joint means formed on said members arranged to hold said members in assembled relation with said disc interposed, said disc engaging said end and said shoulder over surfaces which are unalined axially of said joint, and said members and disc being so formed that said disc is sprung from its normal position when said members are so assembled.

2. In combination, a first member, a nut member carried thereby, a second member formed to surround the portion of said first member projecting beyond said nut member, a resilient disc interposed between said nut member and the adjacent end of said second member, and bayonet joint means formed on said nut member and said second member and arranged to hold said members in assembled relation with said disc interposed, said nut member engaging said disc adjacent the periphery of said disc and said end engaging said disc adjacent the opening in said disc, and said members and disc being so formed that said disc is sprung from its normal position when said members are so assembled.

In testimony whereof I hereunto affix my signature.

CHARLES A. ZAROBSKY.